Sept. 7, 1965  S. HOWARD  3,204,395
FILTER CAP FOR VACUUM CLEANER MOTOR
Filed May 8, 1963
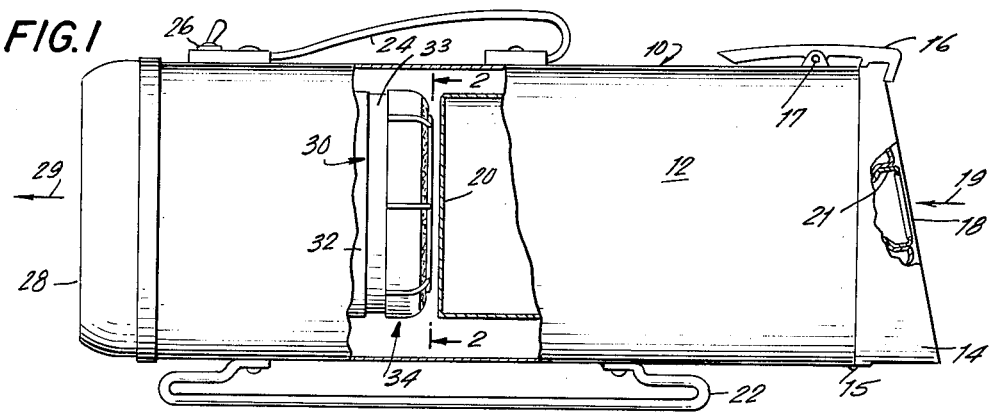
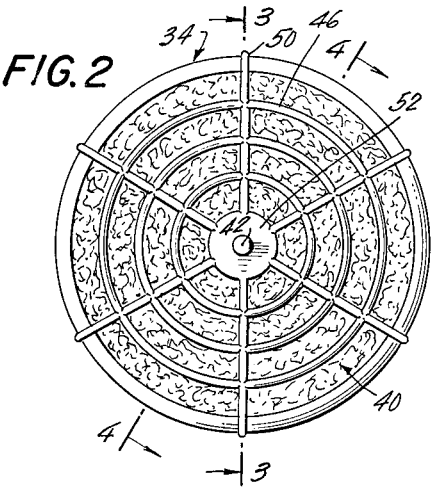
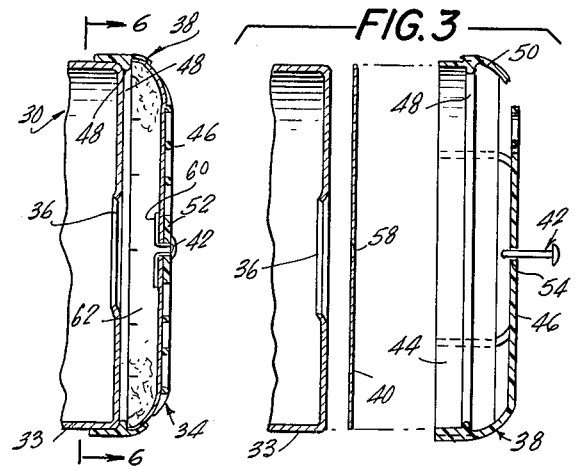
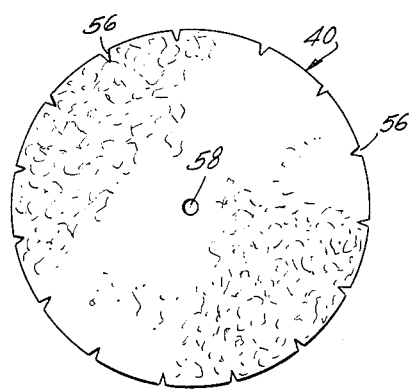
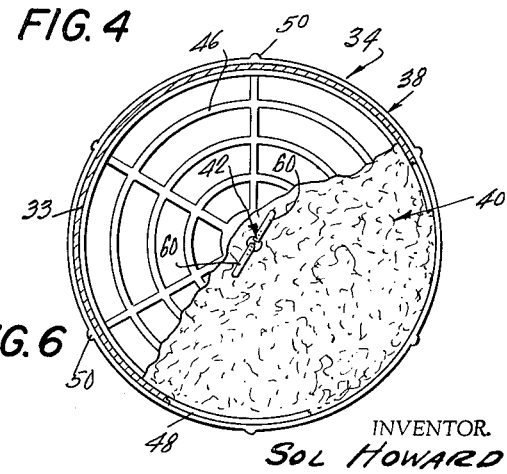
INVENTOR.
SOL HOWARD
BY Friedman & Goodman
ATTORNEYS United States Patent Office 3,204,395
Patented Sept. 7, 1965

3,204,395
FILTER CAP FOR VACUUM CLEANER MOTOR
Sol Howard, Brooklyn, N.Y., assignor to Mil-An Mfg. Corp., a corporation of New York
Filed May 8, 1963, Ser. No. 278,826
1 Claim. (Cl. 55—505)

The present invention relates generally to vacuum or suction cleaners and in particular to a novel secondary filter therefor.

A conventional vacuum cleaner comprises a housing or cannister having an inlet air opening and an outlet air opening. A fan motor is mounted within the housing to provide for suction air flow therethrough. A filter bag or the like is contained within the housing adjacent to the inlet opening to remove dirt and debris from the air stream which flows through the filter bag, past the fan motor and out through the air outlet opening. It is known in the prior art to interpose a secondary filter between the primary filter and the fan motor to assure the substantially complete removal of debris from the air stream flowing over the fan motor and to protect the latter in the event of a rupture of the primary filter or in case of inefficient operation thereof or filtration thereby. However, the secondary filters of the prior art are relatively complex and inefficient. Moreover, they cannot be readily removed and replaced.

In view of the foregoing, it is an object of the present invention to obviate the foregoing disadvantages of prior art secondary filters.

It is another object of the present invention to provide a secondary filter which, although of generally simplified construction, is highly efficient in operation and which can be removed and replaced in a very simple manner and in a very short time and which does not require any degree of mechanical skill or aptitude to effect said removal and replacement.

It is a further object of the present invention to provide a secondary filter in the form of an open-work dome shaped cap provided with a collar which mounts a filter element in position to engage said open-work dome to prevent the passage of foreign material therethrough.

It is a still further object of the present invention to mount the filter on a fan motor end cap provided with a central aperture and to space the filter element therefrom so as to define an enlarged air flow chamber between the filter element and the end cap.

Other and further objects and advantages of the presnet invention will be readily apparent to those skilled in the art from a consideration of the following specification taken in connection with the appended drawing.

In the drawing which illustrates the best mode presently contemplated for carrying out the invention:

FIGURE 1 is a side elevation of a vacuum cleaner provided with a secondary filter pursuant to the present invention, parts being broken away and shown in section for purposes of illustration;

FIGURE 2 is a view, on an enlarged scale, taken in the direction of arrows 2—2 in FIGURE 1;

FIGURE 3 is a sectional exploded view taken on the line 3—3 of FIGURE 2;

FIGURE 4 is a view similar to FIGURE 3, with the parts being shown in their assembled relation;

FIGURE 5 is a plan view of the filter element; and

FIGURE 6 is a sectional view taken on line 6—6 of FIGURE 4, with a part broken away for purposes of illustration.

Referring now to the drawings in detail, there is shown a suction or vacuum cleaner 10 which is provided with a cylindrical body or cannister enclosure 12. The cannister 12 is open at both ends thereof. One end of the cannister is closed by a cover 14 which is hinged thereto, as at 15. A latch member 16, pivoted to the cannister as at 17, releasably locks the cover 14 in the operative condition thereof shown in FIGURE 1. A central air inlet opening 18 is defined in the cover 14 for air flow into the cannister 12 in the direction of arrow 19. An air pervious filter bag 20 is mounted in conventional fashion within the cannister. The open end of the filter bag is engaged on a nozzle 21 which extends into the cannister from the air inlet opening 18 in the cover 14.

The cannister is provided with a pair of conventional skids 22 mounted on the lower surface thereof and with a conventional carrying handle 24 provided on the upper surface thereof. An ON-OFF switch 26 is provided adjacent to the handle. The other open end of the cannister is closed by an outlet end cap 28 which is provided with a conventional central air outlet opening (not illustrated) through which the air flow issues from the cannister, as indicated by the arrow 29.

A motor fan assembly 30 is mounted within the cannister 12 between the end closure cap 28 and the bottom of filter bag 20. Said assembly includes a motor fan housing 32 for a conventional motor fan (not illustrated). The operation of the fan is controlled by switch 26. The fan housing is provided with an end plate or cap in which there is defined a central air-inlet aperture 36.

Pursuant to the present invention, provision is made for a secondary filter means or filter cap assembly 34. As here shown, the filter cap assembly comprises a filter cap 38, a secondary filter element 40 and a securing element 42 to removably secure said filter element in said cap.

The filter cap 38 is a generally cup-shaped shell formed of any material suitable for the purpose, preferably a suitable plastic material. Said filter cap comprises a cylindrical collar 44 which is integral with an open-work or frame dome-shaped cage or head 46. At the inner surface thereof, the collar is provided with an integral circumferential shoulder 48, and at the outer surface thereof, the collar is provided with integral reinforcing ribs 50 which extend into the dome 46 to a central integral disc 52 thereof which is provided with a central aperture 54. The filter cap 38 is provided with a filter element which overlies the cage portion thereof. In the preferred form of the invention herein illustrated the filter element overlies the interior surface of the cage, as will be more particularly hereinafter pointed out. It will be understood however that the disposition of the filter element may also be along the exterior surface of the cage, although in such arrangement certain of the advantages of the invention may not be realized.

The filter element 40 is in the form of a disc which is provided along its circumference with notches or gores 56. The disc 40 is provided also with a central aperture 58. The disc is formed of any suitable air pervious filter material, preferably a matte formed of glass fibers. It will be understood that the diameter of the filter element 40 exceeds the inner diameter of the filter cap.

In forming the filter cap assembly 34, the filter disc 40, which has a desired degree of relative stiffness, is urged into the collar 44 of filter cap 38 toward the frame dome 46 thereof. Due to the fact that the diameter of the disc is larger than the inner diameter of the filter cap, the disc will bend inwardly of and concentrically with its circumferential periphery. Said bending is facilitated by the V-shaped notches 56 which prevent the formation of wrinkles in the disc. The disc is urged into engagement with the dome, as best shown in FIGURE 4. When so engaged, the circumferential peripheral edge of the disc is engaged or seated on the shoulder 48 of collar 44 which serves as a detent for the disc. In order to secure the disc element in snug engagement with the inner surface of the open-frame domed cage, the previously identified clasp 42 is inserted through the cage aperture 54 and the filter disc aperture 58 and the twin legs 60 of the clasp are spread apart to retain the disc snugly against the inner surface of the dome, as shown in FIGURE 6.

The filter cap assembly 34 is mounted on the housing end plate cap 33, as best shown in FIGURE 4. The collar 44 is urged into frictional engagement on to the circumferential wall of end cap 33 until the internal shoulder 48 engages the end cap, as illustrated. An air chamber 62 is defined between the confronting surfaces of the end cap 33 and the filter cap assembly 34. This chamber aids the air flow through the filter disc since the space defined by the chamber permits the air to flow into the chamber rather than directly into the restricted opening 36 in the end cap.

It will be apparent that during operation of the vacuum cleaner 10, the fan motor thereof causes an air flow through cannister 12 in the direction of the arrows 19 and 29. The air is initially filtered as it passes through the filter bag 20 and is filtered a second time as it passes through the filter element 40, the open frame dome 46 providing no impediment for the air flow. The secondary filter 40 serves to remove any remaining grit in the air stream so as to protect the fan motor. In the case of the rupture of the filter bag 20, the filter disc 40 is the sole source of protection for the fan motor.

While I have illustrated and described the presently preferred embodiment of my invention, it will be understood that various changes and modifications may be made therein, without however departing from the inventive concept thereof as set forth in the appended claim.

I claim:

A filter cap assembly for a vacuum cleaner motor housing having an end plate provided with an air inlet port extending therethrough, said cap comprising a cup shaped shell having a collar and a dome provided on said collar, said collar being adapted to encompass and frictionally engage said end plate when disposed thereon, said dome having a disk at the apex thereof and a plurality of circular ribs extending in spaced concentric relation from said disk to said collar, and a plurality of arcuate ribs radiating from said disk to said collar transversely of said circular ribs, said radiating ribs being integral with said circular ribs as well as with said disk and said collar, a circumferential ledge provided on the inner surface of said collar, one surface of said ledge constituting a detent for the end plate, and a filter element disposed within said shell in abutment with the inner surfaces of said disk and said ribs, said filter element having a circumferential peripheral edge, the opposite surface of said ledge constituting a seat for said peripheral edge, and a securing element extending through said disk and the adjacent portion of said filter element for securing the latter in position at the inner surface of said dome.

References Cited by the Examiner
UNITED STATES PATENTS

| | | | |
|---|---|---|---|
| 2,245,760 | 6/41 | Clements | 15—327 X |
| 2,576,726 | 11/51 | Segesman | 55—372 X |
| 2,586,935 | 2/52 | Gerson | 55—486 X |
| 2,815,090 | 12/57 | Humphrey | 55—378 X |
| 3,031,826 | 5/62 | Brimberg et al. | 55—492 |
| 3,050,191 | 8/62 | Gillick et al. | 210—485 |
| 3,075,334 | 1/63 | Nutting | 55—357 |
| 3,082,587 | 3/63 | Brimberg | 55—495 |

ROBERT F. BURNETT, *Primary Examiner.*